Patented July 5, 1949

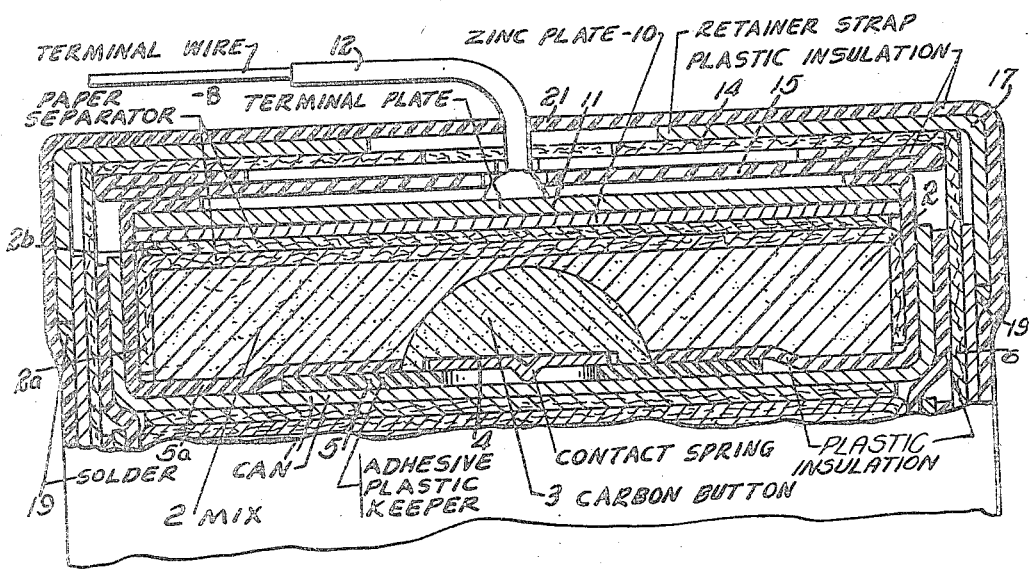
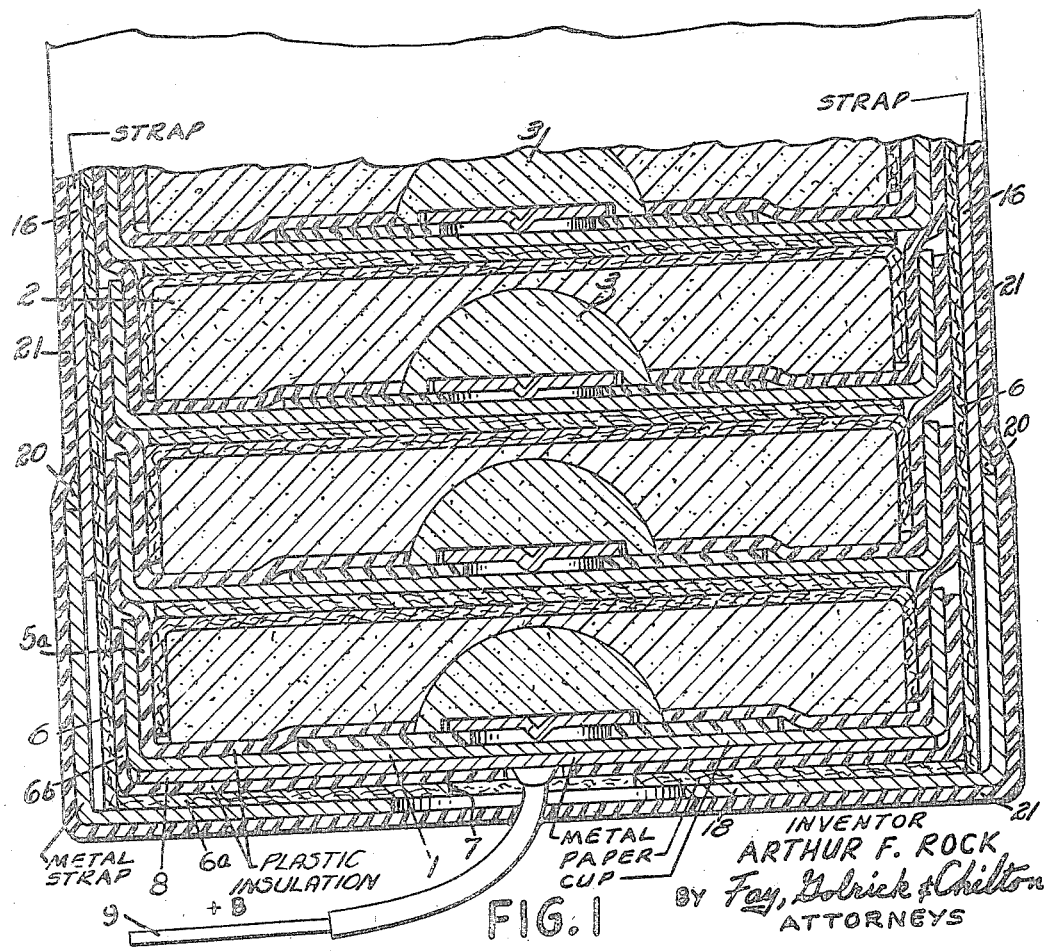
FIG. 1

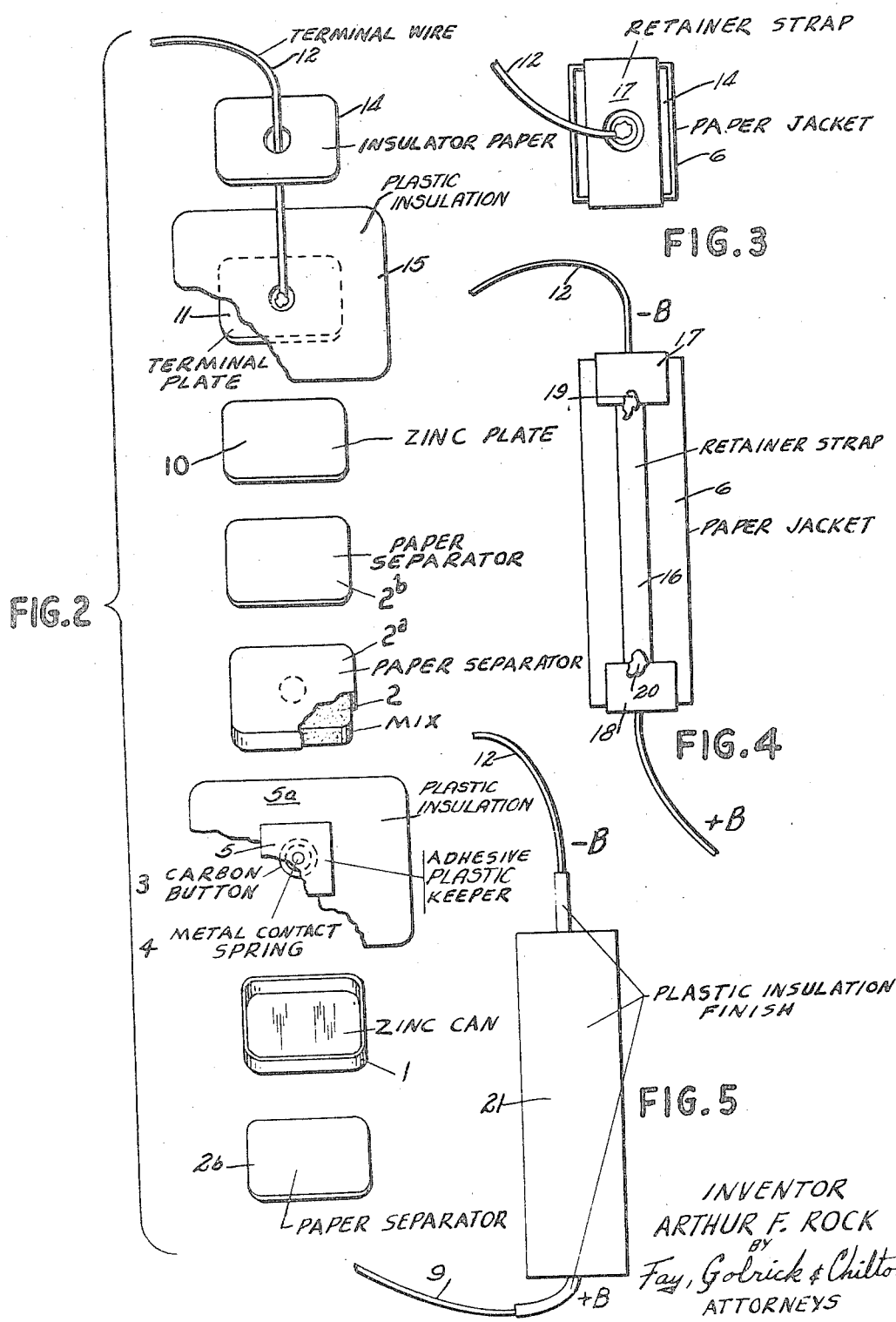

2,475,152

UNITED STATES PATENT OFFICE 2,475,152

FLAT DRY CELL BATTERY UNIT

Arthur F. Rock, Lakewood, Ohio, assignor to General Dry Batteries, Inc., Cleveland, Ohio, a corporation of Ohio Application December 13, 1945, Serial No. 634,651

11 Claims. (Cl. 136—111)

This invention relates to a dry cell battery unit which is made up of a plurality of wafer-like dry cells arranged in a casing in stacked relation and connected in series and held in contact under pressure.

A battery unit of this general type is disclosed in the patent to Cyril P. Deibel No. 2,307,761, issued January 12, 1943.

This invention is an improvement over the battery unit disclosed in the said Deibel patent which shows a series of circular cells, whereas according to this invention, the cells may be of any shape. The reason for making cells of this character square or rectangular is to produce units which will contain the maximum amount of active materials so as to best utilize all available space, thereby providing a battery of high capacity in relation to its size as compared to one using round cells.

According to this invention, I use the outside of the bottom of the zinc can as the active zinc surface and not the inside of the zinc can as in the conventional dry cells now generally known. This construction has a number of advantages in that it permits the use of two or more layers of paste coated lining paper, thereby providing more absorbent medium which retains a greater amount of electrolyte which is essential for maximum service capacity. The mix cake and lining make uniform contact over the whole area of the active zinc without the application of pressure high enough to squeeze the electrolyte out of the mix which condition frequently occurs in many cells having the active materials within a zinc cup the inside of which is active.

During the discharge of these wafer-like dry cells, there is a tendency for expansion or growth of the active mix resulting from chemical changes. If the inside of the zinc cup is used as active zinc, it becomes thinner as the energy is withdrawn from the cell and therefore provides less and less resistance to the increasing size of the active mix.

In this improved construction the outside of the bottom of the zinc cup is an active element and becomes consumed but the side walls of the zinc cup are practically unaffected and hence serve to hold the mix cake against expansion radially as the cell is used with the result that the exhausted cell will be practically the same size as a new cell and hence will not become wedged in the casing in which it is contained.

Another feature is the method of closure of the individual cells and the manner in which each wafer-like cell is held in contact. In the Deibel patent aforementioned, the cells are contained in an outer metal can and held under pressure, the open end of the can being closed with a suitable sealing compound. This method is satisfactory for round cells but is impractical for use with the square or rectangular cells.

In this improved construction a number of wafer-like cells are contained in a water-proof paper container which is open at each end and a strap or band of terneplate extends about each container and holds the cells in place under pressure and in good electrical contact. The entire unit or stack of cells may be dipped or coated with an air drying lacquer or plasticized plastic material which sets but remains somewhat stretchable. If desired, the stack of cells may be sealed within a bag or tube made of rubber hydrochloride, vinyl chloride copolymer or other suitable material.

One of the objects of the invention is to provide a dry cell battery unit which comprises a plurality of cells of any shape and arranged within an outer casing in stacked relation and connected in series and held in contact under pressure, each cell comprising a mass of mix arranged within a shallow zinc cup of any shape and containing a carbon electrode which is electrically connected to the bottom interior of the zinc cup, the upper side of each mass of mix serving as the positive side of each cell and the outer bottom side of each zinc cup serving as the negative side of each cell. The side walls of each of the zinc cups serve to mechanically hold the mix cake against expansion in a radial direction.

Further and more limited objects of the invention will appear as the description proceeds and by reference to the accompanying drawings in which Fig. 1 is a fragmentary sectional view on a greatly enlarged scale of the battery unit embodying the features of the invention;

Fig. 2 is a disassembled view showing the arrangement and order of assembly of the parts;

Fig. 3 is a top plan view of a completed battery unit;

Fig. 4 is a view in side elevation of the completed battery unit;

Fig. 5 is a view in elevation of the battery unit after it has been dipped in or coated with a layer of plastic material.

Figure 6:
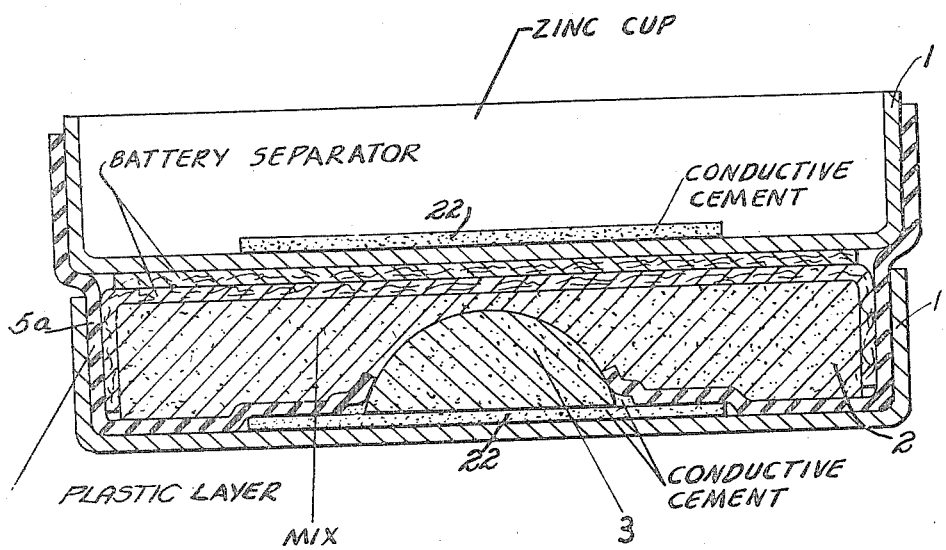
Fig. 6 is a fragmentary sectional view showing a slightly modified form of the invention.

Referring now to the drawings, a preferred form of my dry cell battery unit comprises a plurality of wafer-like cells arranged within a casing in series stacked relation, each cell comprising a shallow zinc cup $1$ of any shape which contains a mass of depolarizing mix $2$ which is wrapped in battery paper and contains electrolyte. The battery paper constitutes the separator; preferably two layers of paste coated battery paper, $2a$ and $2b$, are provided, the layer $2a$ extending downwardly alongside the mix cake and layer $2b$ having a shape similar to the shape of the upper surface of the mix cake and making contact with the outside of the adjacent zinc cup. Each mass of mix has embedded therein a carbon electrode 3 which has secured thereto a metal contact spring 4 secured in place by a thin layer of adhesive insulating material 5, such as a sheet of vinyl chloride copolymer or other plastic insulating material, which has a central opening therein through which the metal contact member projects and contacts the interior bottom of the zinc cup. The layer 5 adheres to a layer or sheet 5a of vinyl chloride copolymer or other plastic insulating material, which is of sufficient size as to extend upwardly considerably beyond the top of the zinc cup or to a point near the top of the next adjacent zinc cup. These parts are shown separately in Figure 2, and in assembled relationship in Figure 1.

As shown in Figure 1, a plurality of cells are arranged in stacked relation within a paper carton 6 which is open at its lower end and closed by paper 6a which has a central opening 7 therein. Extending across the bottom of the zinc cup is a metal terminal plate 8, composed of zinc or terneplate, for example, to which a wire 9 is soldered. A sheet 6b of plastic insulating material such as vinyl chloride copolymer may be disposed between the paper disk 6 and the metal plate 8; the sheet 6b projects upwardly around the exterior of the lowermost zinc cup 1.

In forming the battery unit, a plurality of cells are arranged in stacked relation, the layer of plastic insulating material of each cell projecting upwardly along the side walls of the next adjacent cell. The series of cells are then projected or thrust into the outer paper carton 6. The uppermost cell has a zinc plate 10 disposed over the top thereof, and above the plate 10 there is a terminal plate 11 to which the lead wire 12 is connected. The upper end of the carton is closed by a centrally perforated paper insulator 14, a layer of insulation 15 being disposed between the paper 14 and the terminal plate 11. The stack of cells is bound together by a metal retaining strap preferably composed of terneplate and made up of side straps 16 and an upper end member 17 and a lower end member 18; the end members 17 and 18 are soldered to the side straps as at 19 and 20, respectively, and are apertured to permit passage of the leads 12 and 9. The entire unit or package is then coated with or dipped in quick drying lacquer, plastic or other suitable quick drying material to provide the outer layer 21; if desired, the unit may be enclosed within a bag or tube of vinyl chloride copolymer, rubber hydrochloride or the like.

In Figure 6 there is disclosed a slightly modified form of the invention in which the metal contact plate for forming connection between adjacent cells is replaced by a layer 22 of conductive cement which may be made up of a mixture of varnish and ground coke or carbon which is preferably, though not necessarily, glued to the carbon button. This provides electrical contact between adjacent cells and renders unnecessary the use of a metallic contact member. The adhesive plastic keeper 5 is eliminated in this form. In other respects this form of the invention is substantially the same as that disclosed in Figures 1 to 5, inclusive, and the same reference characters have been used for corresponding parts.

It will be clear that I have provided a dry cell battery unit which will accomplish the objects of the invention as hereinbefore stated. Various changes may be made in details of construction without departing from the spirit of the invention.

Reference is hereby made to my copending application Serial No. 634,652, filed December 13, 1945, which relates to a method of making the battery units disclosed herein.

Having thus described my invention, what I claim is:

1. A dry cell battery unit comprising a plurality of dry cells arranged within a casing in series stacked relation, each cell comprising a shallow zinc cup containing a mass of mix and a carbon electrode, the mass of mix contained in each cup being insulated therefrom except for the electrical connection provided by the carbon electrode, and the carbon electrode for each cell being connected with the interior of the bottom wall of each zinc cup, respectively, there being one or more layers of battery paper disposed between the mix of one cup and the outside bottom wall of the next adjacent cup, and a pair of terminals for the opposite ends of the battery unit.

2. A dry cell battery unit comprising a plurality of dry cells arranged within a casing in series stacked relation, each cell comprising a shallow zinc cup containing a mass of mix and a carbon electrode, the mass of mix contained in each cup being insulated therefrom except for the electrical connection provided by the carbon electrode, and the carbon electrode for each cell being connected with the interior of the bottom wall of each zinc cup, respectively, there being one or more layers of battery paper disposed between the mix of one cup and the outside bottom wall of the next adjacent cup, a pair of terminals for the opposite ends of the battery unit, and means holding said cells in series stacked relation under pressure.

3. A dry cell battery unit comprising a plurality of dry cells arranged within a casing in series stacked relation, each cell comprising a shallow zinc cup containing a mass of mix and a carbon electrode, the mass of mix contained in each cup being insulated therefrom except for the electrical connection provided by the carbon electrode, and the carbon electrode for each cell being connected with the interior of the bottom wall of each zinc cup, respectively, there being one or more layers of battery paper disposed between the mix of one cup and the outside bottom wall of the next adjacent cup, a pair of terminals for the opposite ends of the battery unit, and means holding said cells in series stacked relation under pressure, the entire unit being coated on the exterior with a layer of plastic insulating material.

4. A dry cell battery unit comprising a plurality of dry cells arranged within a casing in series stacked relation, each cell comprising a shallow zinc cup containing a mass of mix and a carbon electrode, the mass of mix contained in each cup being insulated therefrom except for the electrical connection provided by the carbon electrode, and the carbon electrode for each cell being connected with the interior of the bottom wall of each zinc cup, respectively, there being one or more layers of battery paper disposed between the mix of one cup and the outside bottom wall of the next adjacent cup, a pair of terminals for the opposite ends of the battery unit, a metal strap extending lengthwise about said unit and holding the cells in good electrical contact.

5. A dry cell battery unit comprising a plurality of dry cells arranged within an outer casing in stacked relation and connected in series and held in contact under pressure, each cell comprising a mass of mix arranged within a zinc cup and insulated therefrom and containing a carbon electrode which is electrically connected with the bottom of the zinc cup on the interior thereof; the upper side of each mass of mix serving as the positive side of a cell, the negative side of which is constituted by the outer bottom side of the zinc cup immediately above it, there being an electrolyte-containing separator between the mass of mix and the said outer bottom side of the zinc cup.

6. A dry cell battery unit comprising a plurality of dry cells arranged within an outer casing in stacked relation and connected in series, each cell comprising a zinc cup containing a mass of depolarizing mix wrapped in battery paper about its sides and top, a thin layer of plastic insulating material lining the bottom and sides of each zinc cup, each said layer having an opening therein adjacent the bottom of the zinc cup with which it is associated, a carbon electrode embedded in each mass of mix and secured to said layer and having a metal contact spring which engages the bottom of the zinc cup interiorly thereof through the opening in said layer, said layers of plastic insulating material insulating each of said cells from adjacent cells except for the connection between adjacent cells afforded by said metal contact springs, the uppermost cell having a zinc plate over the top thereof to which a terminal is connected, the lowermost cell having a metal contact plate engaging the outside bottom of the adjacent zinc cup and a terminal leading therefrom.

7. A dry cell battery unit comprising a plurality of dry cells arranged within an outer casing in stacked relation and connected in series, each cell comprising a zinc cup containing a mass of depolarizing mix wrapped in battery paper about its sides and top, a thin layer of plastic insulating material lining the bottom and sides of each zinc cup, each said layer having an opening therein adjacent the bottom of the zinc cup with which it is associated, a carbon electrode embedded in each mass of mix and secured to said layer and having a metal contact spring which engages the bottom of the zinc cup interiorly thereof through the opening in said layer, said layers of plastic insulating material insulating each of said cells from adjacent cells except for the connection between adjacent cells afforded by said metal contact spring, the uppermost cell having a zinc plate over the top thereof to which a terminal is connected, the lowermost cell having a metal contact plate engaging the outside bottom of the adjacent zinc cup and a terminal leading therefrom, the layer of plastic insulating material for the topmost cell being folded over the top of the cell and the layer of plastic insulating material for the lowermost cell terminating just below the top edge of the adjacent zinc cup.

8. A dry cell battery unit comprising a plurality of dry cells arranged in stacked relation and connected in series, each cell comprising a zinc cup containing a mass of depolarizing mix, there being one or more layers of battery paper disposed between the mix of one cup and the outside bottom wall of the next adjacent cup, a thin layer of plastic insulating material lining the bottom and sides of each zinc cup, each said layer having an opening therein adjacent the bottom of the zinc cup with which it is associated, a carbon electrode in contact with each mass of mix adjacent the opening in said layer and electrically connected to the bottom of the zinc cup interiorly thereof, said layers of plastic insulating material insulating each of said cells from adjacent cells except for the connection between adjacent cells afforded by said carbon electrode.

9. A dry cell battery unit comprising a plurality of dry cells arranged within an outer casing in stacked relation and connected in series, each cell comprising a zinc cup containing a mass of depolarizing mix and a carbon electrode, each mass of mix being wrapped in battery paper about its sides and top, a layer of plastic insulating material lining the bottom and sides of each zinc cup and extending along the exterior sides of the zinc cup of the adjacent cell, each said layer having an aperture in the portion adjacent the bottom of the zinc cup, a layer of conductive cement disposed adjacent said aperture and adhering to said carbon electrode and said zinc cup and providing electrical contact between each zinc cup and the carbon electrode, said layers of conductive cement serving to provide the series connection between adjacent cells.

10. A dry cell battery unit comprising a plurality of dry cells arranged in stacked relation and connected in series, each cell comprising a zinc cup containing a mass of depolarizing mix and a carbon electrode, there being one or more layers of battery paper disposed between the mix of one cup and the outside bottom wall of the next adjacent cup, a layer of plastic insulating material lining the bottom and sides of each zinc cup, each said layer having an aperture in the portion adjacent the bottom of the zinc cup, a layer of conductive cement disposed adjacent each said aperture and providing electrical contact between each zinc cup and the carbon electrode disposed within it, said layers of conductive cement serving to provide the series connection between adjacent cells.

11. A dry cell battery unit comprising a plurality of dry cells arranged in series stacked relation, each cell comprising a shallow zinc cup containing a mass of mix and a carbon electrode, the mass of mix contained in each cup being insulated therefrom except for the electrical connection provided by the carbon electrode, the carbon electrode for each cell being connected with the interior of the bottom wall of each zinc cup, respectively, there being one or more layers of battery paper disposed between the mix of one cup and the outside bottom wall of the next adjacent cup, and means for insulating the stacked zinc cups from direct contact with each other.

ARTHUR F. ROCK.

REFERENCES CITED

The following references are of record in the file of this patent:

UNITED STATES PATENTS

| Number | Name | Date |
|---|---|---|
| 614,539 | Edgerton | Nov. 22, 1898 |
| 1,611,153 | Benner et al. | Dec. 21, 1926 |
| 2,307,764 | Deibel et al. | Jan. 12, 1943 |
| 2,307,767 | Deibel | Jan. 12, 1943 |
| 2,375,875 | Sanderson | May 15, 1945 |